United States Patent
Senthooran et al.

(10) Patent No.: US 12,073,154 B2
(45) Date of Patent: Aug. 27, 2024

(54) PRESSURE CANCELATION OF UNSTEADY BOUNDARY CONDITIONS DURING SIMULATION OF FLUID FLOWS

(71) Applicant: Dassault Systemes Americas Corp., Waltham, MA (US)

(72) Inventors: Sivapalan Senthooran, Dearborn, MI (US); Mohamed Ibrahim Eldesouky, Livonia, MI (US); Robert Powell, Livonia, MI (US); Ales Alajbegovic, Livonia, MI (US)

(73) Assignee: Dassault Systemes Americas Corp., Waltham, MA (US)

( * ) Notice: Subject to any disclaimer, the term of this patent is extended or adjusted under 35 U.S.C. 154(b) by 854 days.

(21) Appl. No.: 17/060,264

(22) Filed: Oct. 1, 2020

(65) Prior Publication Data
US 2022/0108055 A1    Apr. 7, 2022

(51) Int. Cl.
*G06F 30/28*    (2020.01)
*G06F 111/04*   (2020.01)
*G06F 111/10*   (2020.01)
*G06F 113/08*   (2020.01)

(52) U.S. Cl.
CPC .......... *G06F 30/28* (2020.01); *G06F 2111/04* (2020.01); *G06F 2111/10* (2020.01); *G06F 2113/08* (2020.01)

(58) Field of Classification Search
CPC .. G06F 30/28; G06F 2111/04; G06F 2111/10; G06F 2113/08
See application file for complete search history.

(56) References Cited

FOREIGN PATENT DOCUMENTS

CN    111368487 A    *   7/2020    ............ G16C 10/00
CN    111859825 A    *   10/2020   ............ G06F 30/28

OTHER PUBLICATIONS

Bernd Crouse et al.' "Fundamental Aeroacoustic Capabilities of the Lattice-Boltzmann Method"; 12th AIAA/CEAS Aeroacoustics Conference (27th AIAA Aeroacoustics Conference) May 8-10, 2006, (Year: 2006).*

(Continued)

*Primary Examiner* — Rehana Perveen
*Assistant Examiner* — Nupur Debnath
(74) *Attorney, Agent, or Firm* — Fish & Richardson P.C.

(57) ABSTRACT

Disclosed are computer implemented techniques for correcting for numerically generated pressure waves at an inlet of a simulation space. The techniques include receiving a model of a simulation space and applying an inlet pressure to an inlet of the simulation space. The applied inlet pressure generates fluctuating velocities that produce undesired, numerically-generated pressure waves. The numerically generated pressure waves are measured to establish a measured pressure history. The measured pressure history is subtracted from the applied inlet boundary pressure history to provide a set of boundary conditions. The process conducts a fluid simulation using the set of boundary conditions. The process repeats using a subsequent set of boundary conditions, until an iteration is reached where the measured pressures near the inlet are sufficiently small to compensate for undesired, numerically-generated pressure waves, and thereafter stores that subsequent set of boundary conditions to provide a corrected set of boundary conditions.

21 Claims, 6 Drawing Sheets

(56) References Cited

OTHER PUBLICATIONS

Robert E. Powell et al.; "Statistical analysis of correlation between simulation and measurement of interior wind noise" Proceedings of the ASME 2010 3rd Joint US-European Fluids Engineering Summer Meeting and 8th international conference, FEDSM-ICNMM2010 (Year: 2010).*

Bradley Duncan et al.; "Vehicle aerodynamics impact of on-road turbulence"; Automobile Engineering 2017, vol. 231(9) 1148-1159 IMechE 2017 (Year: 2017).*

Julien Berthaut-Gerentes et al.; "LES: Unsteady Atmospheric Turbulent Layer Inlet. A Precursor Method Application and Its Quality Check"; Computation 2015, 3, 262-273; (Year: 2015).*

* cited by examiner

PRESSURE CANCELATION OF UNSTEADY BOUNDARY CONDITIONS DURING SIMULATION OF FLUID FLOWS

BACKGROUND

This description relates to computer simulation of physical processes, such as physical fluid flows.

High Reynolds number flow has been simulated by generating discretized solutions of the Navier-Stokes or Boltzmann differential equations by performing high-precision floating point arithmetic operations. One approach to simulate a problem of interest uses the so called Large-Eddy Simulation (LES) and another approach is the so called Direct Numerical Simulation (DNS).

LES involves a mathematical model of turbulence that is used in various computational fluid dynamic problems. One aspect of LES involves a reduction in computational cost by ignoring smallest length scales, as these are the most computationally expensive to resolve.

For digital simulation of airflow over vehicles, using LES or DNS or other approaches, introducing upstream turbulence to better represent in-service flow conditions is a desired feature. Unfortunately, many methods used to produce an incoming turbulence pattern in compressible, digitally-simulated airflow also produce undesired acoustic pressure waves that are not present in the unbounded physical environment of operation.

SUMMARY

According to an aspect, a computer-implemented method for correcting for numerically generated pressure waves at an inlet of a simulation space includes receiving a model of a simulation space, applying an inlet pressure to an inlet of the simulation space, which applied pressure generates fluctuating velocities that produce undesired, numerically-generated pressure waves that randomly vary in time and space at the inlet, measuring the numerically generated pressure waves to establish a measured pressure history, subtracting the measured pressure history from the applied inlet boundary pressure to provide a set of boundary conditions, conducting a subsequent fluid simulation using the set of boundary conditions, repeating the measuring, subtracting and the conducting using at least one subsequent set of boundary conditions, until an iteration is reached where the measured pressures near the inlet are sufficiently small to compensate for undesired, numerically-generated pressure waves emanating from an inlet boundary condition, and storing the subsequent set of boundary conditions of the iteration that was reached to provide a corrected set of boundary conditions for an actual simulation.

Embodiments of the methods can include any one or more of the following features. Embodiments of the methods can also include any of the other features described herein, including any combinations of features described in connection with different embodiments, unless expressly stated otherwise.

Measuring measures pressure near the inlet which includes the numerically generated pressure waves to establish a measured pressure history. The number of iterations is selected in a range of two to twenty iterations. The number of iterations is two to three iterations.

The method further includes receiving the model of the simulation space that includes a mesh defining a representation of a physical object in the simulation space. The method includes retrieving the corrected set of boundary conditions and simulating a fluid flow about the representation of the physical object in the simulation space. The simulation space is a digital wind tunnel.

The fluid flow is analyzed over a turbulent flow. Measuring further includes iteratively comparing the set of boundary conditions to a threshold value and repeating the iteration using a subsequent simulation, when the set of boundary conditions satisfies the threshold value. Each iteration of subtracting further includes subtracting the measured pressure from the applied inlet boundary pressure history with mean flow velocity removed to provide the set of boundary conditions.

According to an additional aspect, a system to correct for numerically generated pressure waves at an inlet of a simulation space includes one or more processor devices, memory operatively coupled to the one or more processor devices, storage media storing a computer program including instructions to configure the system to receive a model of a simulation space, apply an inlet pressure to an inlet of the simulation space, which applied pressure generates fluctuating velocities that produce undesired, numerically-generated pressure waves that randomly vary in time and space at the inlet, measure the numerically generated pressure waves to establish a measured pressure history, subtract the measured pressure history from the applied inlet boundary pressure to provide a set of boundary conditions, conduct a subsequent fluid simulation using the set of boundary conditions, repeat the measuring, subtracting and the conducting using at least one subsequent set of boundary conditions, until an iteration is reached where the measured pressures near the inlet are sufficiently small to compensate for undesired, numerically-generated pressure waves emanating from an inlet boundary condition, and store the subsequent set of boundary conditions of the iteration that was reached to provide a corrected set of boundary conditions for an actual simulation.

Embodiments of the systems can include any one or more of the following features. Embodiments of the systems can also include any of the other features described herein, including any combinations of features described in connection with different embodiments, unless expressly stated otherwise.

The instructions further configured the system to receive the model of the simulation space that includes a mesh defining a representation of a physical object in the simulation space. The instructions further configured the system to retrieve the corrected set of boundary conditions and simulate a fluid flow about the representation of the physical object in the simulation space. The instructions to measure further configured the system to iteratively compare the set of boundary conditions to a threshold value and repeat the iteration using a subsequent simulation, when the set of boundary conditions satisfies the threshold value. Each iteration of the instructions to subtract further configured the system to subtract the measured pressure history from the applied inlet boundary pressure history with mean flow velocity removed to provide the set of boundary conditions.

According to an additional aspect, a computer program product stored on a non-transitory computer readable storage medium, the computer program product for correcting for numerically generated pressure waves at an inlet of a simulation space includes instructions to cause a system to receive a model of a simulation space, apply an inlet pressure to an inlet of the simulation space, which applied pressure generates fluctuating velocities that produce undesired, numerically-generated pressure waves that randomly vary in time and space at the inlet, measure the numerically generated pressure waves to establish a measured pressure history, subtract the measured pressure history from the applied inlet boundary pressure to provide a set of boundary conditions, conduct a subsequent fluid simulation using the set of boundary conditions, repeat the measuring, subtracting and the conducting using at least one subsequent set of boundary conditions, until an iteration is reached where the measured pressures near the inlet are sufficiently small to compensate for undesired, numerically-generated pressure waves emanating from an inlet boundary condition, and store the subsequent set of boundary conditions of the iteration that was reached to provide a corrected set of boundary conditions for an actual simulation.

Embodiments of the products can include any one or more of the following features. Embodiments of the products can also include any of the other features described herein, including any combinations of features described in connection with different embodiments, unless expressly stated otherwise.

The instructions further include instructions to receive the model of the simulation space that includes a mesh defining a representation of a physical object in the simulation space. The instructions further include instructions to retrieve the corrected set of boundary conditions, and simulate a fluid flow about the representation of the physical object in the simulation space. The instructions to measure further include instructions to iteratively compare the set of boundary conditions to a threshold value and repeat the iteration using a subsequent simulation, when the set of boundary conditions satisfies the threshold value. The instructions to subtract further include instructions to subtract the measured pressure history from the applied inlet boundary pressure history with mean flow velocity removed to provide the set of boundary conditions.

One or more of the above aspects may provide one or more of the following advantages.

The above aspects provide an iterative technique that attenuates undesired, numerically-generated pressure waves. These numerically-generated pressure waves might occur in a digital representation of simulation space, but are not actually present in the physical space. An example of a confined simulation space is a digital representation of a wind tunnel. An example of an open simulation space is a digital representation of a road. The above aspects enable more-accurate simulation of dynamic pressure loads on objects such as vehicles that can be applied to calculate, e.g., body panel vibration and interior wind noise. Such simulations permit the design of newer vehicles with better performance, in less time, and at lower cost than by building and testing physical prototypes.

DETAILED DESCRIPTION

Figure 1:
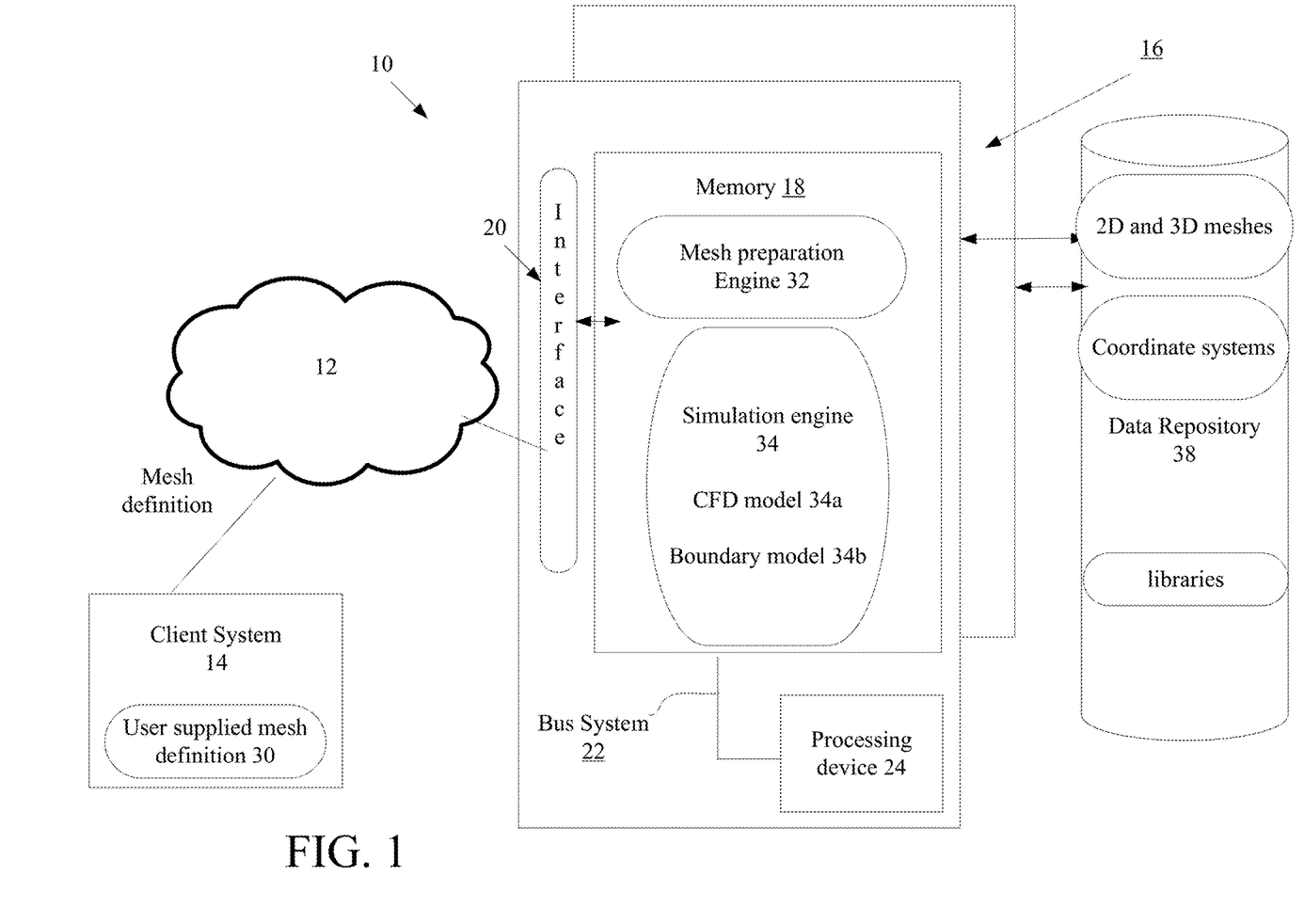
FIG. 1 depicts a system for simulation of fluid flows, which includes a turbulent boundary layer model for compressible fluid flows.

Referring now to FIG. 1, a system 10 includes a simulation engine 34 configured for CFD simulations using any CFD model such as the family of Large Eddy Simulation (LES) or Direct Numerical Simulation (DNS) models. For the purposes of discussion, the simulation engine 34 includes a LES model module 34a that executes a LES model, and a boundary module 34b that specifies boundary conditions for use with the LES model module 34a. The boundary conditions executed in the boundary module 34b are derived as discussed below from a universal solution that satisfies turbulent behavior within a boundary layer that eliminates or substantially cancels undesired, numerically-generated pressure waves emanating from an inlet boundary condition. Examples of digitally boundary conditions include an unbounded condition such as a digital representation of a road or a bounded condition such as a digital representation of a wind tunnel.

The system 10, in this implementation, is based on a client-server or cloud-based architecture and includes a server system 12 implemented as a massively parallel computing system 12 (stand alone or cloud-based) and a client system 14. The server system 12 includes memory 18, a bus system 11, interfaces 20 (e.g., user interfaces/network interfaces/display or monitor interfaces, etc.) and a processing device 24. In memory 18 are a mesh preparation engine 32 and the simulation engine 34.

While FIG. 1 shows the mesh preparation engine 32 in memory 18, the mesh preparation engine can be a third-party application that is executed on a different system than server 12. Whether the mesh preparation engine 32 executes in memory 18 or is executed on a different system than server 12, the mesh preparation engine 32 receives a user-suppled mesh definition 30 and the mesh preparation engine 32 prepares a mesh and sends (and or stores) the prepared mesh to the simulation engine 34 according to a physical object that is being modelled for simulation by the simulation engine 34. The system 10 accesses a data repository 38 that stores 2D and/or 3D meshes (Cartesian and/or curvilinear), coordinate systems, and libraries. Any number physical objects or physical fluid flows can be represented in a simulation space that is used to represent the physical object or physical flow. Simulations can be used in a broad range of technical and engineering problems including aerodynamic/aerospace analysis, weather, environmental engineering, industrial systems, biological systems, general fluid flows, and combustion systems, etc. Of particular interest is simulation of a vehicle in a wind tunnel. This will be the example used in the description below.

Figure 2:
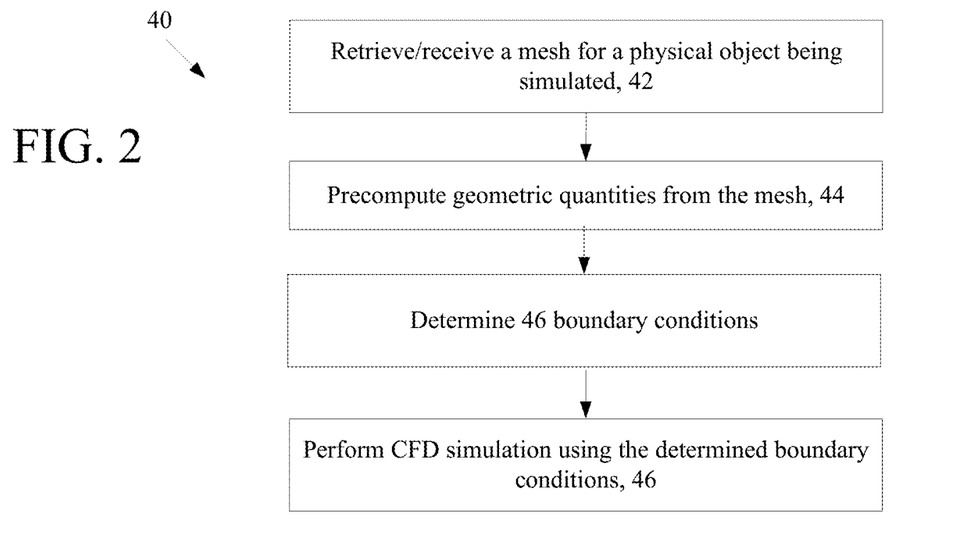
FIG. 2 depicts a flow chart showing operations for formulation of a computational fluid dynamics model.

Referring now to FIG. 2, a generalized process 40 for performing a LES simulation of a fluid flow about a physical object is shown. The process retrieves or receives a mesh fitted to the physical object being simulated and precomputes 44 geometric quantities from the retrieved or received mesh and proceeds to determine boundary conditions 46.

The process 40 determines 46 boundary conditions (e.g., in the boundary module 34b) based on the retrieved mesh and flow field variables. Flow field variables such as velocity, turbulence, etc., are used to compute boundary conditions in the boundary module 34b. Once the turbulence variables are known, partial differential equations are solved.

The process performs 48 a computational fluid dynamic simulation (CFD) using the LES model. The LES model is initialized by the boundary conditions and is executed in LES model module 34a, using the precomputed geometric quantities corresponding to the retrieved mesh.

Figure 3:
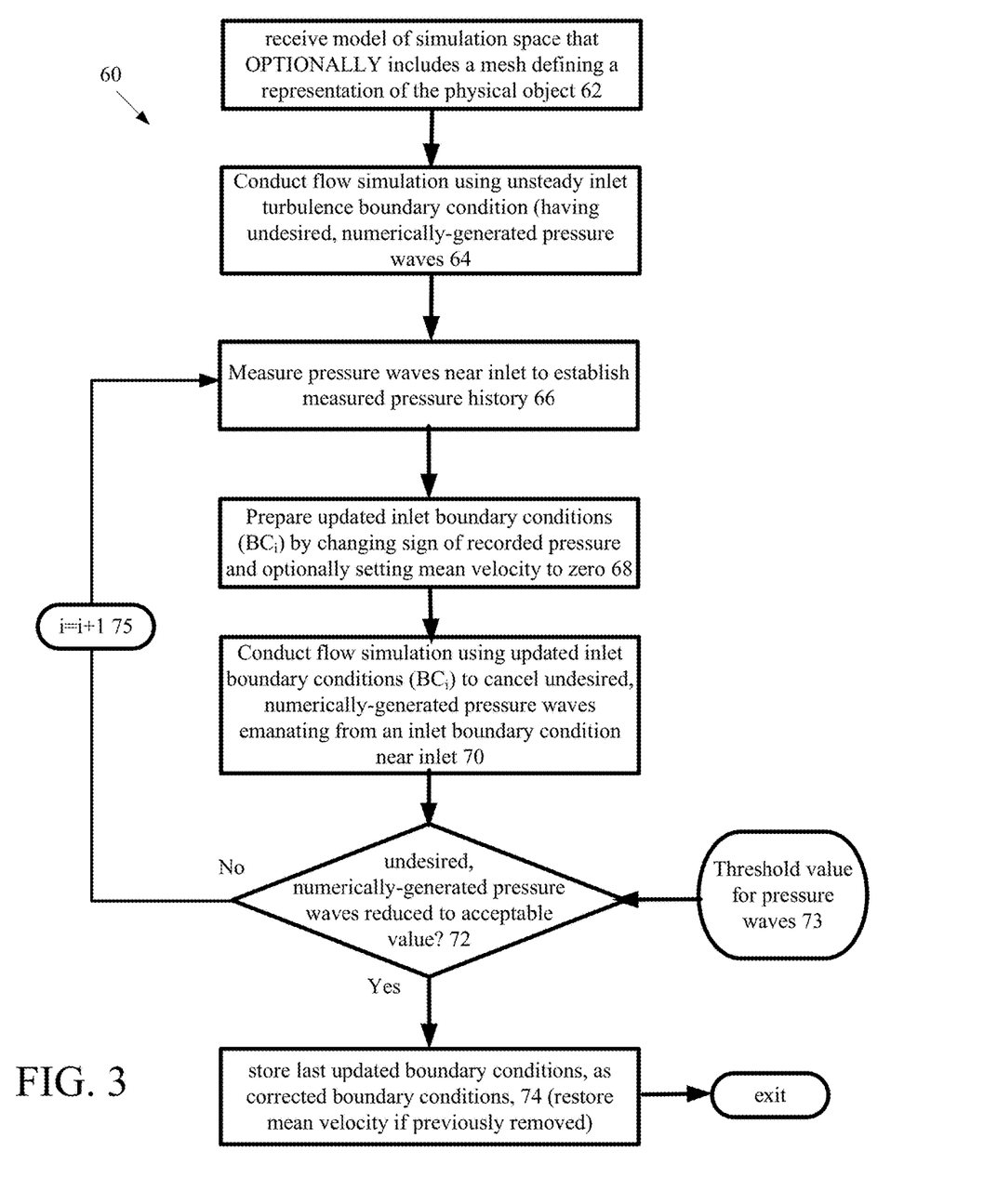
FIG. 3 depicts a flow chart showing operations for correction to inlet boundary conditions.

Referring now to FIG. 3, a process 60 for determining corrected boundary conditions that can be used in the simulation of FIG. 2, is shown. In some embodiments, the process 60 includes receiving 62 by a computing system, a model of a simulation space that includes a mesh that defines a representation of the physical object in the simulation space, with the mesh comprising plural cells having resolutions to account for surfaces of the physical object.

However, in other embodiments, the correction process is not bounded by the use of the mesh that defines the physical object. That is, in FIG. 3, the physical object need not be a part of the process 60 for determining corrected boundary conditions. In the remainder of the discussion of FIG. 3, the physical object is not part of the steps being performed, as the thrust of the discussion below is to correct the inlet of the simulation space for the undesired, numerically-generated pressure waves.

Continuing with the process 60, the process 60 includes conducting 64 a flow simulation using unsteady inlet turbulence boundary conditions that produces the numerically-generated pressure waves. The process also includes measuring 66 the pressure and velocity near the wind tunnel inlet to establish a measured pressure history.

The process 60 also includes preparing 68 a set of updated inlet boundary conditions (BCi) by changing a sign of the measured pressure (and optionally by setting mean velocity to zero). However, in some instances, the use of the mean velocity is preferred, such as, with high Mach number flows (e.g., Mach number 0.5 or higher). Thus, in those examples, it may be preferable to keep the mean velocity during cancellation. The process 60 includes conducting 70 a subsequent flow simulation using the updated inlet boundary conditions (BC$_i$) to cancel the undesired, numerically-generated pressure waves near inlet. In order to derive the corrected boundary conditions, as discussed above, the fluid flow is analyzed over a near the inlet.

The process 60 determines 72 whether the undesired, numerically-generated pressure waves were sufficiently reduced, for example, by comparing the undesired, numerically-generated pressure waves generated prior to the simulation to a retrieved 73 threshold value representative of a value of sufficiently reduced undesired, numerically-generated pressure waves.

When the undesired, numerically-generated pressure waves were reduced to or below the threshold value, the process 60 stores 74 the latest iteration of the determined boundary conditions for subsequent simulations that use the same parameters that define the digitally represented simulation environment, e.g., a digital wind tunnel, and the input flow conditions at the input to the digitally represented simulation environment, e.g., digital wind tunnel.

When the undesired, numerically-generated pressure waves were not reduced to or below the threshold value, the process 60 conducts another iteration by measuring the pressure wave near the inlet to establish a subsequent measured pressure history 66 prepare a subsequent updated inlet boundary conditions by changing the sign of the measured pressure, with optionally the mean velocity still being set to zero 68. The process then conducts a subsequent flow simulation 70 using the subsequent updated in boundary conditions to cancel undesired, numerically-generated pressure waves at the inlet and again performs a subsequent test 72 to determine if the undesired, numerically-generated pressure waves were reduced to an acceptable value as determined by the comparison to the threshold value.

Thus, process 60 produces updated inlet boundary conditions BC by repeating steps 66 through 72, until the undesired, numerically-generated pressure waves are reduced to or below the threshold value 73. When the process 60 satisfies that test 72, the process stores the latest iteration of the determined boundary conditions 74 for subsequent simulations that use the same parameters that define the digitally represented simulation environment, e.g., a digital wind tunnel, and the input flow conditions at the input to the digitally represented simulation environment, e.g., digital wind tunnel.

The process can perform the flow simulations with either the mean flow velocity removed or left in. Typically, at the point that the corrected boundary conditions are determined the mean flow velocity is stored along with the corrected boundary conditions.

An unsteady turbulent inlet turbulent boundary condition is defined by fluctuating velocities in time and space, and is given by $$V_x = V_{x\ char} + V'_x(x,y,z,t)$$

$$V_y = V_{y\ char} + V'_y(x,y,z,t)$$

$$V_z = V_{z\ char} + V'_z(x,y,z,t)$$

where $V_x$ is the velocity component in x-direction; $V_y$ is the velocity component in y-direction; $V_z$ is the velocity component in z-direction; $V_{x\ char}$ is the characteristic velocity in x-direction; $V_{y\ char}$ is the characteristic velocity in y-direction; $V_{z\ char}$ is the characteristic velocity in z-direction; (x, y, z) is the location in x, y, and z space; $V'_x$ is the velocity fluctuation in the x direction; $V'_y$ is the velocity fluctuation in the x direction; $V'_z$ is the velocity fluctuation in the z direction; and t is time.

The fixed pressure used at the inlet (e.g., to the wind tunnel) is given by $$P_{inlet}(x,y,z) = P_{char}$$

where $P_{inlet}$ is the inlet pressure and $P_{char}$ is the characteristic pressure. Fluctuating velocities are generated to satisfy the desired turbulence intensities and length scales for the problem that is being solved.

However, even though a fixed pressure is used at the inlet, the fluctuating velocities produce undesired, numerically-generated pressure waves that randomly vary in time and space at the inlet, and which contaminate the simulation. These undesired, numerically-generated pressure waves are not present in the actual physical environment. It is unrealistic to believe that there exists a theoretical basis upon which these undesired, numerically-generated pressure waves can be canceled, since they are produced by random velocity fluctuations that vary in space and time, in order to satisfy the prescribed statistics for the inlet boundary condition.

As set out above, these undesired, numerically-generated pressure waves are canceled by producing time varying pressure waves of equal amplitudes in the opposite direction, at each inlet point where the velocity fluctuations are defined. Cancelling undesired, numerically-generated pressure waves are obtained at an initial execution of a simulation, by recording the canceling undesired, numerically-generated pressure waves generated in time and space at the inlet in the initial simulation and changing the sign of the undesired, numerically-generated pressure waves. The cancelling pressure waves are used during a next simulation (or iteration) to cancel the undesired, numerically-generated pressure waves, through changing the sign of the canceling pressure waves.

In one embodiment, at each of the iterations, the mean velocity is removed for inlet velocities during each iteration occurs when the undesired, numerically-generated pressure waves substantially reduced as per the threshold value. This avoids the mean velocity being affected by the pressure cancellation and ensures that the final flow simulation has the desired mean velocity for the problem that is being solved:

$$V'_{x\_inlet} = V_{x\_recorded} - V_{x\,char}$$

$$V'_{y\_inlet} = V_{y\_recorded} - V_{y\,char}$$

$$V'_{z\_inlet} = V_{z\_recorded} - V_{z\,char}$$

where $V'_{x\_inlet}$ is the new inlet x component velocity boundary condition (fluctuation only); $V'_{y\_inlet}$ is the new inlet y component velocity boundary condition (fluctuation only); $V'_{z\_inlet}$ is the new inlet z component velocity boundary condition (fluctuation only); $V_{x\_recorded}$, $V_{y\_recorded}$ and $V_{z\_recorded}$ are recorded velocities in the x, y and z directions respectively, and $V_{x\,char}$, $V_{y\,char}$, and $V_{z\,char}$ are the characteristic velocities in x, y and z directions respectively.

In other embodiments, the mean velocity remains at each of the iterations. If removed, the mean velocity is added back for an actual simulation, as discussed below in conjunction with FIG. 4.

The pressure at the inlet is specified as:

$$P_{inlet} = P_{char} - (P_{recorded} - P_{char})$$

where $(P_{recorded} - P_{char})$ is the cancelling pressure at each inlet point and $P_{inlet}$ is the inlet pressure that is not a constant. $P_{inlet}$ is a pressure that varies in time due to the generation of and subsequent cancellation of the undesired, numerically-generated pressure waves. The time and space varying pressure at the inlet $(P_{recorded} - P_{char})$ will cancel the undesired, numerically-generated pressure waves generated by the velocity fluctuations.

Generally, the velocity fluctuations are distributed differently for each simulation when compared to a previous simulation. Therefore, the entire undesired, numerically-generated pressure waves generally will not be cancelled in one simulation, but are still significantly reduced. Generally, two, three or several simulation iterations are needed. However, for extremely low undesired, numerically-generated pressure waves fewer than or equal to ten iterations are used. Thus, a useful range of iterations is two to ten iterations. However, other ranges such as up to 20 iterations could be used to reduce these pressure fluctuations to extremely low values so that they do not unreasonably contaminate the final simulation. In any event, the undesired, numerically-generated pressure waves that are generated at the inlet are undesired and numerical generated, therefore no useful information that occurs in the physical world is lost by cancelling these undesired, numerically-generated pressure waves using this pressure cancellation at the inlet.

Figure 4:
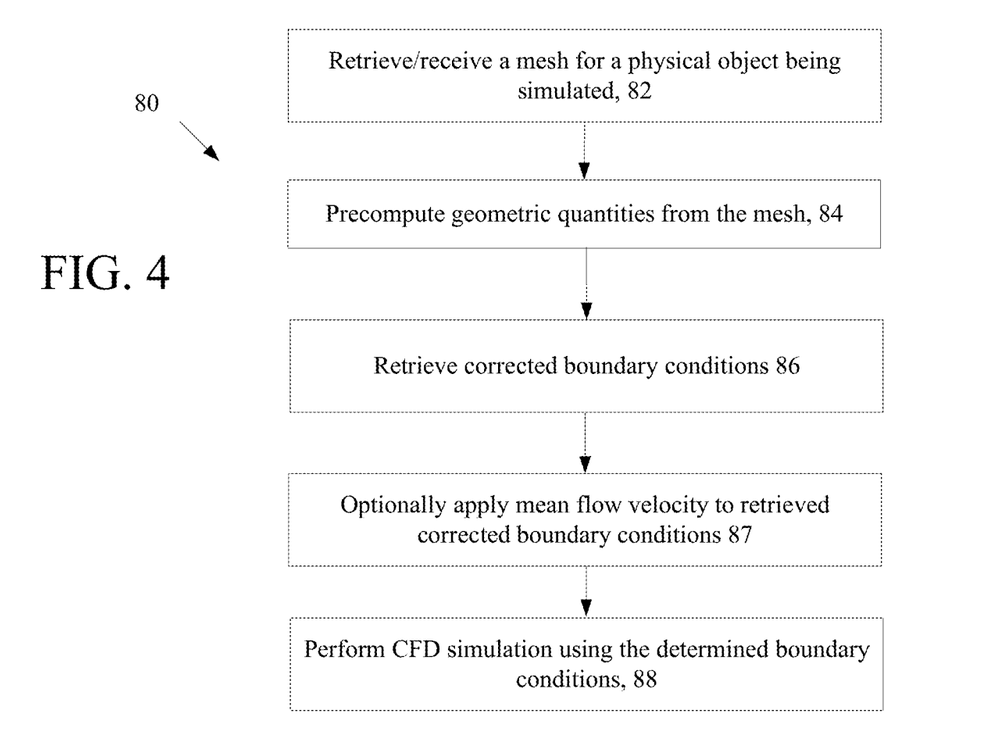
FIG. 4 depicts a flow chart showing operations for applying a corrected set of boundary conditions for performing a fluid dynamic simulation about a representation of a physical object.

For a simulation that uses the corrected boundary conditions, the mean velocity is now added back to the inlet velocities, if it was removed previously, to satisfy the desired flow condition for the problem being simulated.

$$V_x = V_{x\_recorded} + V_{x\,char}$$

$$V_y = V_{y\_recorded} + V_{y\,char}$$

$$V_z = V_{z\_recorded} + V_{z\,char}$$

where $V_x$, $V_y$ and $V_z$ are the inlet x, y and z components velocity boundary conditions; $V_{x\_recorded}$, $V_{y\_recorded}$ and $V_{z\_recorded}$ are recorded velocities in the x, y and z directions respectively from the previous iteration, and $V_{x\,char}$, $V_{y\,char}$, and $V_{z\,char}$ are the characteristic velocities in x, y and z directions respectively.

The inlet pressure is the measured pressure from the last iteration that reduced the undesired, numerically-generated pressure waves below the threshold $$P_{inlet} = P_{recorded}.$$

At that point any further cancellation may not be needed since the undesired, numerically-generated pressure waves are already very low due to the prior iterations.

$P_{inlet}$ is not a constant value, but instead $P_{inlet}$ varies in time and space.

The inlet boundary conditions used for the final simulation have the inlet velocity fluctuations that satisfy the desired turbulence intensity that the user wants to use for the problem, the mean velocity that the user wants to use for the problem and very low undesired, numerically-generated pressure waves so that the flow simulation is not contaminated.

Referring now to FIG. 4, in the use example that will be discussed herein, the physical object is a motorized vehicle (vehicle). The vehicle is merely illustrative however, as the physical object can be of any shape, and in particular can have planar and/or curved surface(s). The process 80 retrieve/receives 82 a mesh for the physical object being simulated. If needed, the process 80 precomputes 84 geometric quantities from the mesh and retrieves 86 the corrected boundary conditions that were determined in FIG. 3. The process 80 applies corrected boundary conditions and performs 88 the CFD simulation (e.g., the LES) using the corrected boundary conditions.

Figure 5A:
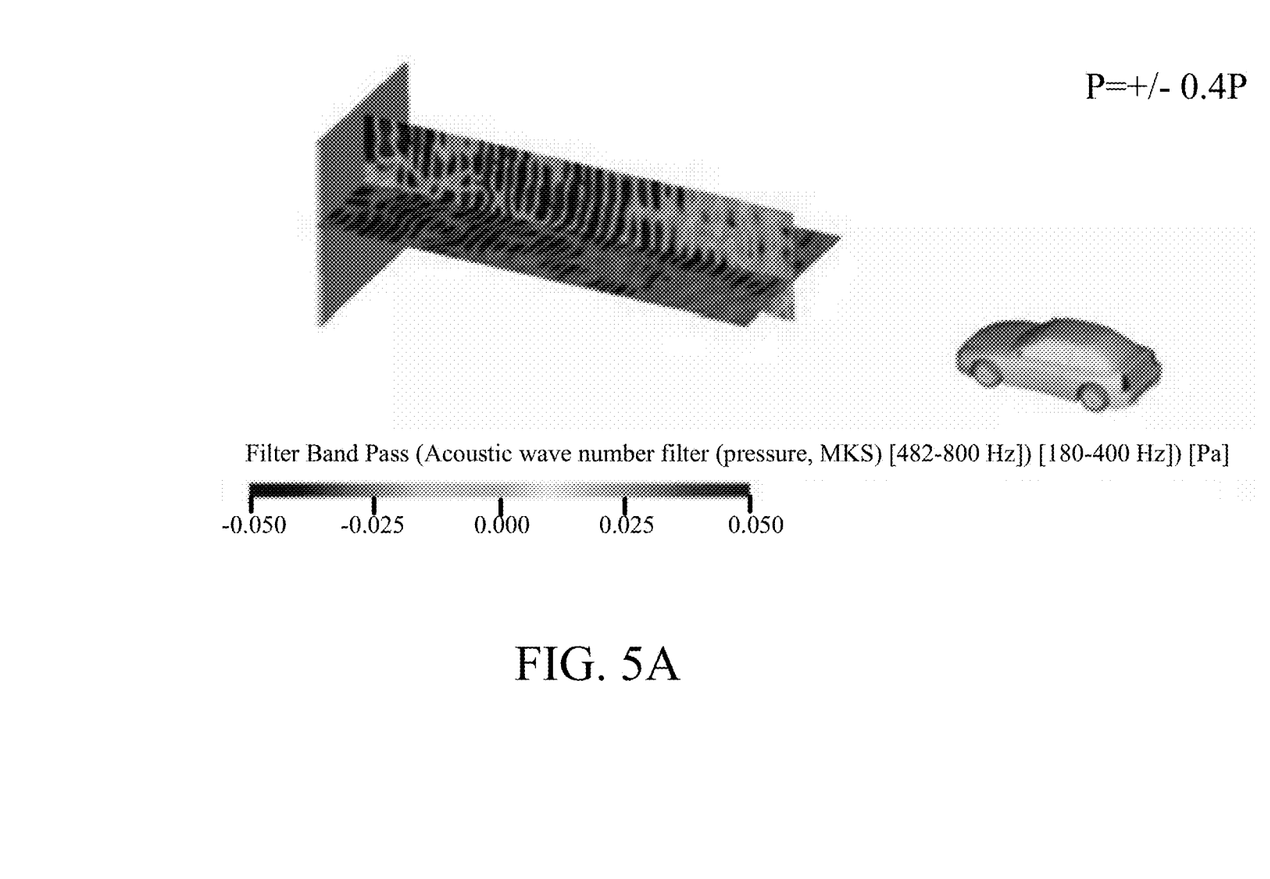
FIGS. 5A and 5B are diagrams that depict undesired, numerically-generated pressure generation without (FIG. 4A) correction and with (FIG. 4B) correction of FIG. 3.

Referring now to FIG. 5A this figure depicts undesired, numerically-generated pressure generation without the corrective action of FIG. 3. As can be seen in FIG. 5A, across a filter band bass of pressure in a range of 482-800 Hz, there is a castellated irregular structure resulting from use of the undesired numerical generated pressure waves in the simulation.

Figure 5B:
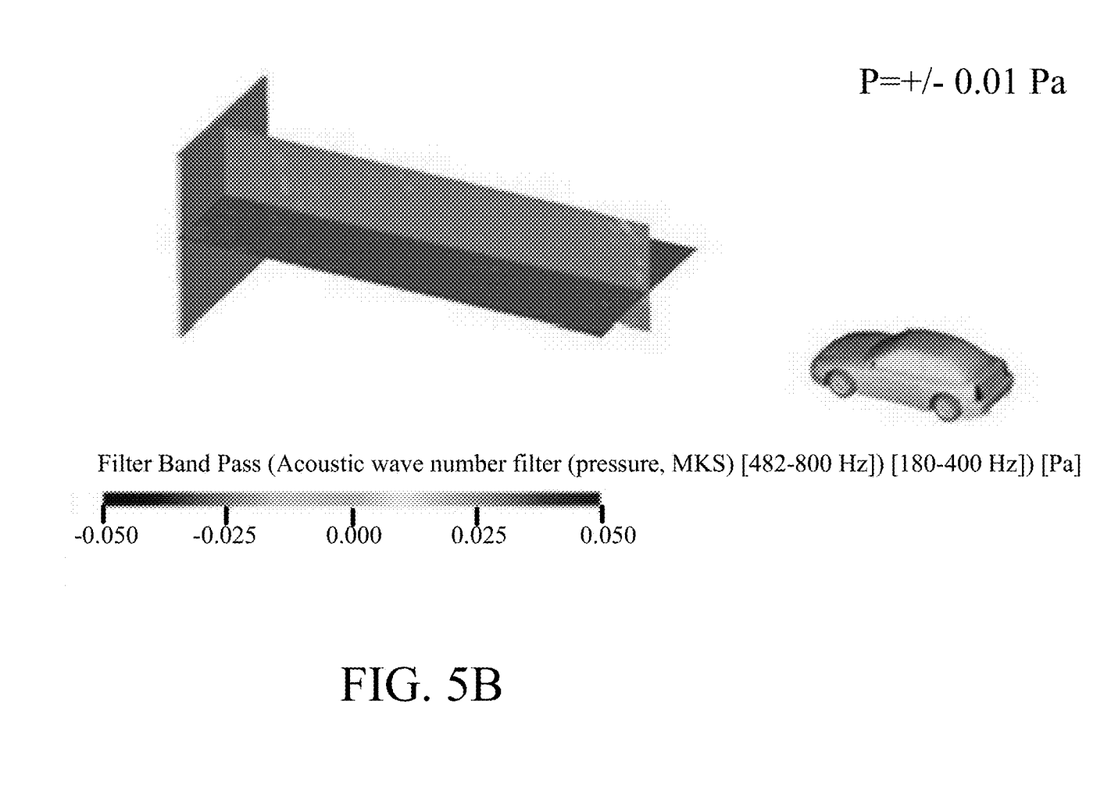

Referring now to FIG. 5B, this figure depicts the undesired, numerically-generated pressure generation of FIG. 5A, substantially removed by use of the corrective action of FIG. 3. As can be seen in FIG. 5B, across the filter band bass of pressure in a range of 482-800 Hz, there is no longer the castellated irregular structure, but rather a more uniform structure that results from substantial elimination of the undesired numerical generated pressure waves in the actual simulation.

Figure 6:
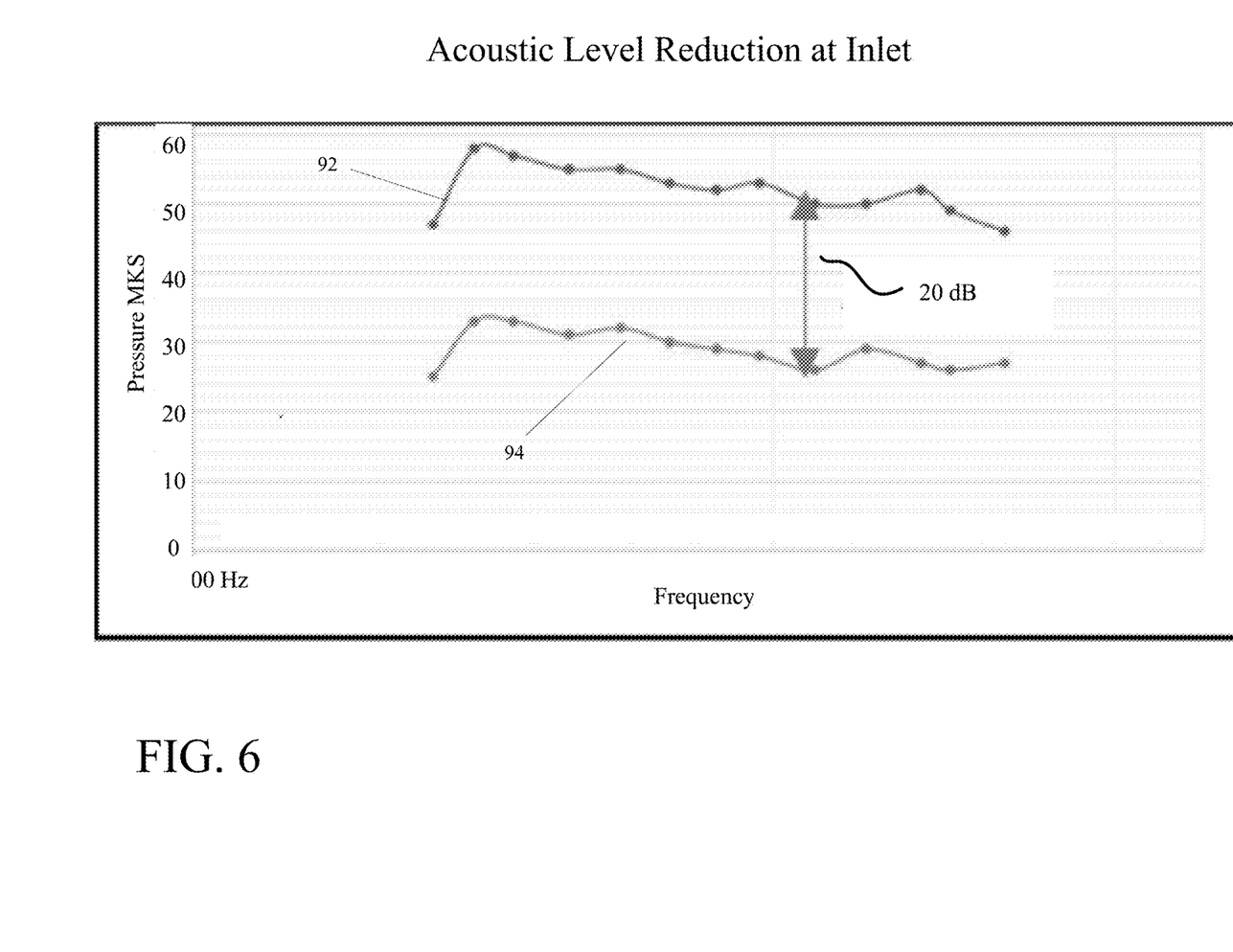
FIG. 6 is a plot that illustrates acoustic level reduction at inlet.

Referring now to FIG. 6 is a plot of pressure v. frequency shows about 20 dB reduction in acoustic pressure level at the digital wind tunnel inlet from a baseline pressure 92 to a pressure 94 subsequent to application of the process 60 of FIG. 3.

Embodiments of the subject matter and the functional operations described in this specification can be implemented in digital electronic circuitry, tangibly-embodied computer software or firmware, computer hardware (including the structures disclosed in this specification and their structural equivalents), or in combinations of one or more of them. Embodiments of the subject matter described in this specification can be implemented as one or more computer programs (i.e., one or more modules of computer program instructions encoded on a tangible non-transitory program carrier for execution by, or to control the operation of, data processing apparatus). The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example, a programmable processor, a computer, or multiple processors or computers. The apparatus can also be or further include special purpose logic circuitry (e.g., an FPGA (field programmable gate array) or an ASIC (application-specific integrated circuit)). In addition to hardware, the apparatus can optionally include code that creates an execution environment for computer programs (e.g., code that constitutes processor firmware, a protocol stack, a database management system, an operating system, or a combination of one or more of them).

A computer program, which can also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document, in a single file dedicated to the program in question, or in multiple coordinated files (e.g., files that store one or more modules, sub-programs, or portions of code)). A computer program can be deployed so that the program is executed on one computer or on multiple computers that are located at one site or distributed across multiple sites and interconnected by a data communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry (e.g., an FPGA (field programmable gate array) or an ASIC (application-specific integrated circuit)).

Computers suitable for the execution of a computer program can be based on general or special purpose microprocessors or both, or any other kind of central processing unit. Generally, a central processing unit will receive instructions and data from a read-only memory or a random-access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data (e.g., magnetic, magneto-optical disks, or optical disks), however, a computer need not have such devices. Moreover, a computer can be embedded in another device (e.g., a mobile telephone, a personal digital assistant (PDA), a mobile audio or video player, a game console, a Global Positioning System (GPS) receiver, or a portable storage device (e.g., a universal serial bus (USB) flash drive), to name just a few).

Computer-readable media suitable for storing computer program instructions and data include all forms of non-volatile memory on media and memory devices, including by way of example semiconductor memory devices (e.g., EPROM, EEPROM, and flash memory devices), magnetic disks (e.g., internal hard disks or removable disks), magneto-optical disks, and CD-ROM and DVD-ROM disks. The processor and the memory can be supplemented by, or incorporated in, special purpose logic circuitry.

Embodiments of the subject matter described in this specification can be implemented in a computing system that includes a back-end component (e.g., as a data server), or that includes a middleware component (e.g., an application server), or that includes a front-end component (e.g., a client computer having a graphical user interface or a web browser through which a user can interact with an implementation of the subject matter described in this specification), or any combination of one or more such back-end, middleware, or front-end components. The components of the system can be interconnected by any form or medium of digital data communication (e.g., a communication network). Examples of communication networks include a local area network (LAN) and a wide area network (WAN) (e.g., the Internet).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a user device (e.g., for purposes of displaying data to and receiving user input from a user interacting with the user device), which acts as a client. Data generated at the user device (e.g., a result of the user interaction) can be received from the user device at the server.

While this specification contains many specific implementation details, these should not be construed as limitations on the scope of any invention or on the scope of what can be claimed, but rather as descriptions of features that can be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features can be described above as acting in certain combinations and even initially claimed as such, one or more features from a claimed combination can in some cases be excised from the combination, and the claimed combination can be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing can be advantageous.

What is claimed is:

1. A computer-implemented method for correcting for numerically generated pressure waves at an inlet of a simulation space comprises:
receiving, by a data processing system, a digital representation of the simulation space, the digital representation including a mesh comprising a plurality of cells;
applying, by the data processing system, a pressure with fluctuating velocities to cells of the plurality located at an inlet of the simulation space, the pressure producing undesired, numerically-generated pressure waves that randomly vary in time and space at the inlet;
until pressures near the inlet of the simulation space are sufficiently small to compensate for the undesired, numerically-generated pressure waves emanating from an inlet boundary condition, performing operations by the data processing system including:
identifying, by the data processing system, the numerically generated pressure waves to establish a pressure history for the cells of the plurality located at the inlet;
determining, by the data processing system, a corrected set of boundary conditions for the cells of the plurality located at the inlet based on the pressure history;
digitally simulating, by the data processing system, a fluid flow in the digital representation of the simulation space using the corrected set of boundary conditions at the cells of the plurality located at the inlet; and
storing in a hardware storage device data representing the corrected set of boundary conditions for a subsequent simulation.

2. The method of claim 1 wherein identifying, measures pressure near the inlet which includes the numerically generated pressure waves to establish a measured pressure history.

3. The method of claim 1 wherein a number of iterations is selected in a range of two to twenty iterations.

4. The method of claim 1 wherein a number of iterations is two to three iterations.

5. The method of claim 1, further comprises:
receiving the digital representation of the simulation space that includes a mesh defining a digital representation of a physical object in the simulation space.

6. The method of claim 5, further comprises:
retrieving the corrected set of boundary conditions; and
simulating a fluid flow about the representation of the physical object in the simulation space.

7. The method of claim 5 wherein the simulation space is a digital wind tunnel.

8. The method of claim 1 wherein the fluid flow is analyzed over a turbulent flow.

9. The method of claim 1 wherein identifying further comprises:
iteratively comparing the set of boundary conditions to a threshold value; and
repeating the iteration using a subsequent simulation, when the set of boundary conditions satisfies the threshold value.

10. The method of claim 1 wherein each iteration of determining the corrected boundary conditions further comprises:
subtracting the pressure history from the applied pressure at the inlet with mean flow velocity removed to provide the set of boundary conditions.

11. A system to correct for numerically generated pressure waves at an inlet of a simulation space comprises:
one or more processor devices;
memory operatively coupled to the one or more processor devices;
storage media storing a computer program comprising instructions to configure the system to:
receive a digital representation of the simulation space, the digital representation including a mesh comprising a plurality of cells;
apply an inlet pressure to cells of the plurality located at an inlet of the simulation space, which applied pressure generates fluctuating velocities that produce undesired, numerically-generated pressure waves that randomly vary in time and space at the inlet;
until pressures near the inlet of the simulation space are sufficiently small to compensate for the undesired, numerically-generated pressure waves emanating from an inlet boundary condition, performing operations including:
identify the numerically generated pressure waves to establish a pressure history for the cells of the plurality located at the inlet;
determine a corrected set of boundary conditions for the cells of the plurality located at the inlet based on the pressure history;
digitally simulate a fluid flow in the digital representation of the simulation space using the corrected set of boundary conditions at the cells of the plurality located at the inlet; and
store in a hardware storage device data representing the corrected set of boundary conditions for a subsequent simulation.

12. The system of claim 11 wherein the instructions further configure the system to:
receive the digital representation of the simulation space that includes a mesh defining a digital representation of a physical object in the simulation space.

13. The system of claim 12 wherein the instructions further configure the system to:
retrieve the corrected set of boundary conditions; and
simulate a fluid flow about the digital representation of the physical object in the simulation space.

14. The system of claim 11 wherein the instructions to identify further configure the system to:
iteratively compare the set of boundary conditions to a threshold value; and
repeat the iteration using a subsequent simulation, when the set of boundary conditions satisfies the threshold value.

15. The system of claim 11 wherein each iteration of the instructions to determine the corrected set of boundary conditions further configure the system to:
subtract the pressure history from the applied pressure at the inlet with mean flow velocity removed to provide the corrected set of boundary conditions.

16. A computer program product stored on a non-transitory computer readable storage medium, the computer program product for correcting for numerically generated pressure waves at an inlet of a simulation space comprises instructions to cause a system to:
receive a digital representation of the simulation space, the digital representation including a mesh comprising a plurality of cells;

apply an inlet pressure to cells of the plurality of cells located at an inlet of the simulation space, which applied pressure generates fluctuating velocities that produce undesired, numerically-generated pressure waves that randomly vary in time and space at the inlet;

until pressures near the inlet of the simulation space are sufficiently small to compensate for the undesired, numerically-generated pressure waves emanating from an inlet boundary condition, performing operations including:

identify the numerically generated pressure waves to establish a pressure history for the cells of the plurality located at the inlet;

determine a corrected set of boundary conditions for the cells of the plurality located at the inlet based on the pressure history;

digitally simulate a fluid flow in the digital representation of the simulation space using the corrected set of boundary conditions at the cells of the plurality located at the inlet; and store in a hardware storage device data representing the corrected set of boundary conditions for a subsequent simulation.

17. The computer program product of claim 16 wherein the instructions further comprise instructions to:

receive the digital representation of the simulation space that includes a mesh defining a digital representation of a physical object in the simulation space.

18. The computer program product of claim 17 wherein the instructions further comprise instructions to:

retrieve the corrected set of boundary conditions; and simulate a fluid flow about the representation of the physical object in the simulation space.

19. The computer program product of claim 16 wherein the instructions to identify further comprise instructions to:

iteratively compare the set of boundary conditions to a threshold value; and repeat the iteration using a subsequent simulation, when the set of boundary conditions satisfies the threshold value.

20. The computer program product of claim 16 wherein the instructions to determine the corrected set of boundary conditions further comprise instructions to:

subtract the pressure history from the applied pressure at the inlet with mean flow velocity removed to provide the corrected set of boundary conditions.

21. The method of claim 1 wherein the subsequent simulation using the corrected set of boundary conditions generates smaller numerically-generated pressure waves than the subsequent simulation using the set of boundary conditions.

* * * * *